US005359318A

United States Patent [19]

Asai et al.

[11] Patent Number: 5,359,318

[45] Date of Patent: Oct. 25, 1994

[54] HAND-HELD ELECTRONIC APPARATUS USING TWO BATTERIES SEQUENTIALLY SUPPLYING CURRENT TO INDUCTIVE ELEMENT

[75] Inventors: Takayuki Asai, Tokyo; Yukio Sato, Shizuoka, both of Japan

[73] Assignee: NEC Corporation, Tokyo, Japan

[21] Appl. No.: 967,906

[22] Filed: Oct. 29, 1992

[30] Foreign Application Priority Data

Oct. 29, 1991 [JP] Japan .................................. 3-309801

[51] Int. Cl.[5] .............................................. H04Q 1/30

[52] U.S. Cl. ............................ 340/311.1; 340/825.48; 340/636; 340/663; 340/455; 320/48; 320/13; 320/38; 320/40; 307/10.7; 361/92

[58] Field of Search ........... 340/311.1, 825.44–825.48, 340/636, 635, 660, 661, 663, 691, 455, 384 E; 455/343, 31, 228, 38; 320/48, 13, 38, 40; 307/10.7; 361/92; 290/38 R

[56] References Cited

U.S. PATENT DOCUMENTS 4,755,816 7/1988 DeLuca ............................ 340/311.1
4,908,523 3/1990 Snowden et al. ...................... 307/43
4,940,975 7/1990 Ide et al. .......................... 340/311.1

FOREIGN PATENT DOCUMENTS 62-299161 12/1987 Japan .
02-249521 10/1990 Japan .

*Primary Examiner*—John K. Peng
*Assistant Examiner*—Nina Tong
*Attorney, Agent, or Firm*—Foley & Lardner

[57] ABSTRACT

In a hand-held electronic apparatus, such as radio display pager, a control circuit is powered by a first battery to produce an control signal for operating an inductive device such as vibrator. A second battery is provided having an internal resistance lower than the internal resistance of the first battery. A capacitor is connected in parallel with the inductive device and the voltage developed thereacross is monitored by a voltage sensor, which produces a sensor output when the voltage exceeds a prescribed level. A first switching circuit is responsive to the control signal for coupling the inductive device to the second battery and responsive to the sensor output for decoupling it from the second battery. A second switching circuit also responds to the sensor output for coupling the inductive device to the first battery until the control signal ceases to exist.

8 Claims, 3 Drawing Sheets

HAND-HELD ELECTRONIC APPARATUS USING TWO BATTERIES SEQUENTIALLY SUPPLYING CURRENT TO INDUCTIVE ELEMENT

BACKGROUND OF THE INVENTION

The present invention relates generally to hand-held electronic apparatus, such as radio display pagers, which comprise an inductive element that produces a transient surge current, and more specifically to a power supply circuit for such apparatus.

Conventional radio display pagers include a vibrator for alerting users on receiving a message. The use of vibrator is particularly useful when a pager is used in a noisy environment or in an environment in which silence is observed. Such vibrators comprise an inductive element that drains a large transient current from the battery and a substantial voltage drop results if the internal resistance of the battery is high. If the pager includes a memory, stored data would be lost by the voltage drop. Since the internal resistance of a battery increases as its size decreases, the use of small batteries to meet compact design requirement would produce instances in which loss of stored data is likely to occur. Although the use of a high capacity battery would solve the problem, battery sizes are standardized, and hence an increase in battery size requires a prohibitively large space in the hand-held apparatus.

SUMMARY OF THE INVENTION

It is therefore an object of the present invention to provide a hand-held electronic apparatus having an inductive element wherein the apparatus allows compact design while preventing loss of stored data.

According to a broader aspect, the hand-held electronic apparatus of this invention includes an inductive device, and a control circuit powered by a first main battery for producing a control signal for operating the inductive device. A second auxiliary battery is provided having an internal resistance lower than the internal resistance of the first battery. A battery switching circuit responds to the control signal for coupling the inductive device to the second battery for a first period in which the inductive device produces a transient surge current, and subsequently coupling the inductive device to the first battery for a second period in which the inductive device produces a steady current.

According to a specific aspect, the battery switching circuit includes a capacitor connected in parallel with the inductive device, a voltage sensor for detecting when a voltage developed across the capacitor exceeds a prescribed level and producing a sensor output, a first switching circuit responsive to the presence of the control signal for coupling the inductive device to the second battery and responsive to the sensor output for decoupling the inductive device from the second battery. A second switching circuit is provided to respond to the sensor output for coupling the inductive device to the first battery and further respond to the absence of the control signal for decoupling the inductive device from the first battery.

BRIEF DESCRIPTION OF THE DRAWINGS

The present invention will be described in further detail with reference to the accompanying drawings, in which.

DETAILED DESCRIPTION

Figure 1:
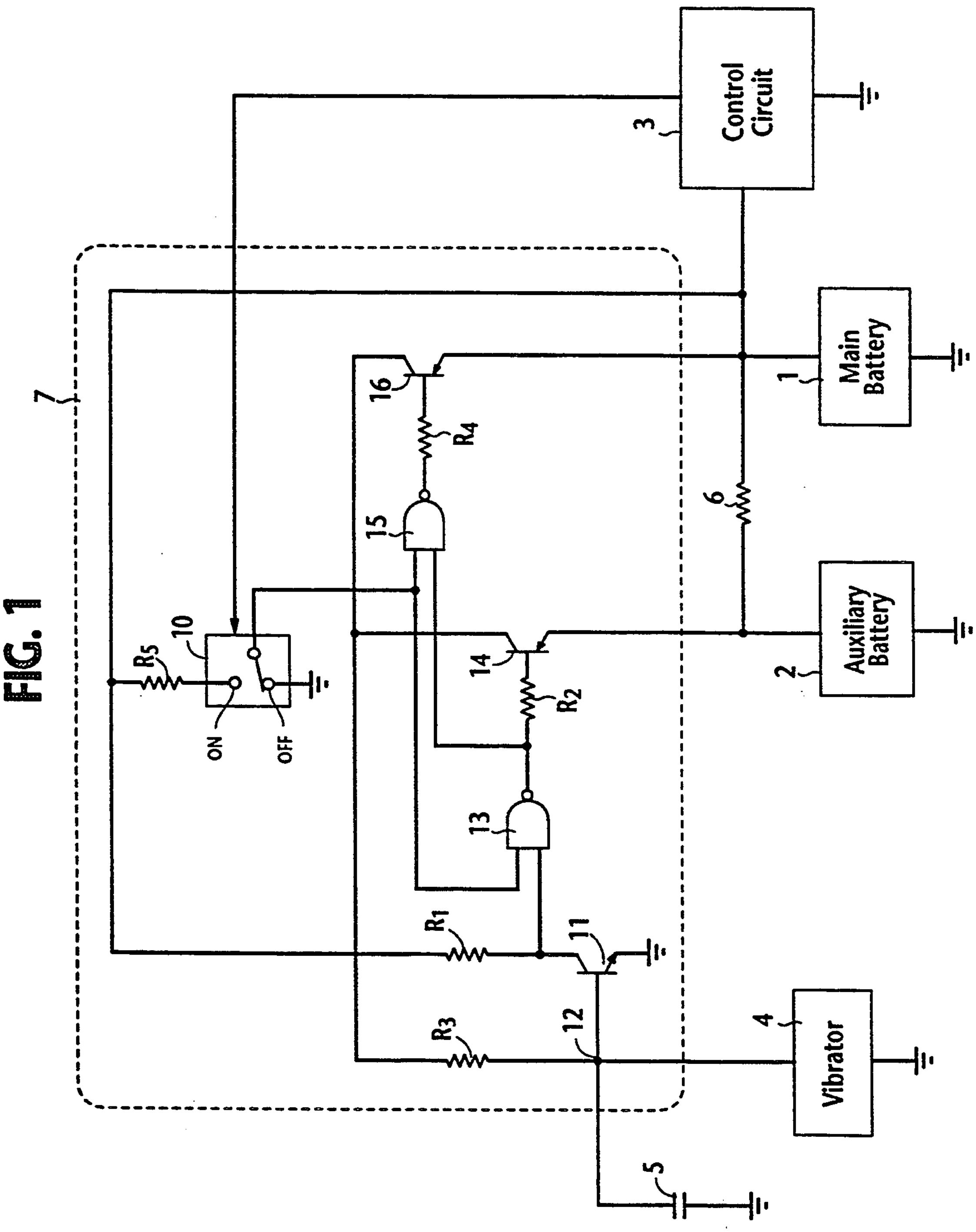
FIG. 1 is a block diagram of a power circuit according to a first embodiment of the present invention.

In FIG. 1, a power supply circuit according to a first embodiment of the present invention comprises a main, high-power battery 1 having a high internal resistance such as manganese battery, and an auxiliary, low-power battery 2 having a low internal resistance such as nickel cadmium battery. The main battery is interchangeably mounted in a hand-held electronic apparatus such as radio display pager for ease of replacement with a fresh battery and the auxiliary battery is a rechargeable battery and is mounted permanently in the apparatus. The apparatus includes a control circuit 3 which is powered by the main battery to provide overall control of the pager as well as a current source for vibrator 4 in a manner as will be described. Vibrator 4 is activated when a message is received from a calling party to alert the called user through elastic vibrations. A capacitor 5 is in shunt with the vibrator to absorb a transient current that is produced at the instant the vibrator is activated. A resistor 6 is coupled between the positive electrodes of the main and auxiliary batteries to recharge the auxiliary battery with a current from the main battery.

The power supply circuit of this invention includes a battery switching circuit 7 which comprises a switch 10 which is normally positioned to ground, or turn-off terminal and switches to a turn-on terminal in response to a control signal supplied from control circuit 3 when the user is to be alerted upon receipt of a message. Battery switching circuit 7 includes an n-p-n transistor 11 with its emitter being connected to ground. The collector of transistor 11 is coupled through a resistor $R_1$ to the positive electrode of the main battery. The base of transistor 11 is connected to a circuit junction 12, to which the vibrator 4 and capacitor 5 are jointly connected, to sense a voltage developed at junction 12 at the instant the vibrator is activated.

The collector of transistor 11 is also connected to a NAND gate 13 to which the output of switch 10 is also connected to determine a period in which the vibrator is activated with a current supplied from the auxiliary battery. The output of NAND gate 13 is coupled by a resistor $R_2$ to the base of a p-n-p transistor 14. The emitter of transistor 14 is connected to the positive electrode of the auxiliary battery, the collector of transistor 14 being coupled through a resistor $R_3$ to the circuit junction 12 to energize the vibrator with a current from the auxiliary battery as long as transistor 14 is in a turn-on state that occurs in response to a low-level (logic 0) input from NAND gate 13.

The output of NAND gate 13 is further connected to a NAND gate 15 to which the output of switch 10 is also connected to determine a period in which the vibrator is energized with a current supplied the main battery, instead of the current from the auxiliary battery. The output of NAND gate 15 is coupled through a resistor $R_4$ to the base of a p-n-p transistor 16 whose emitter is coupled to the positive electrode of the main battery and whose collector is jointly coupled with the collector of transistor 14 to the circuit junction 12 through resistor $R_3$. Thus, the vibrator is activated with a current from the main battery as long as transistor 16 is in an ON state that occurs in response to a low-level input from NAND gate 15.

Figure 2:
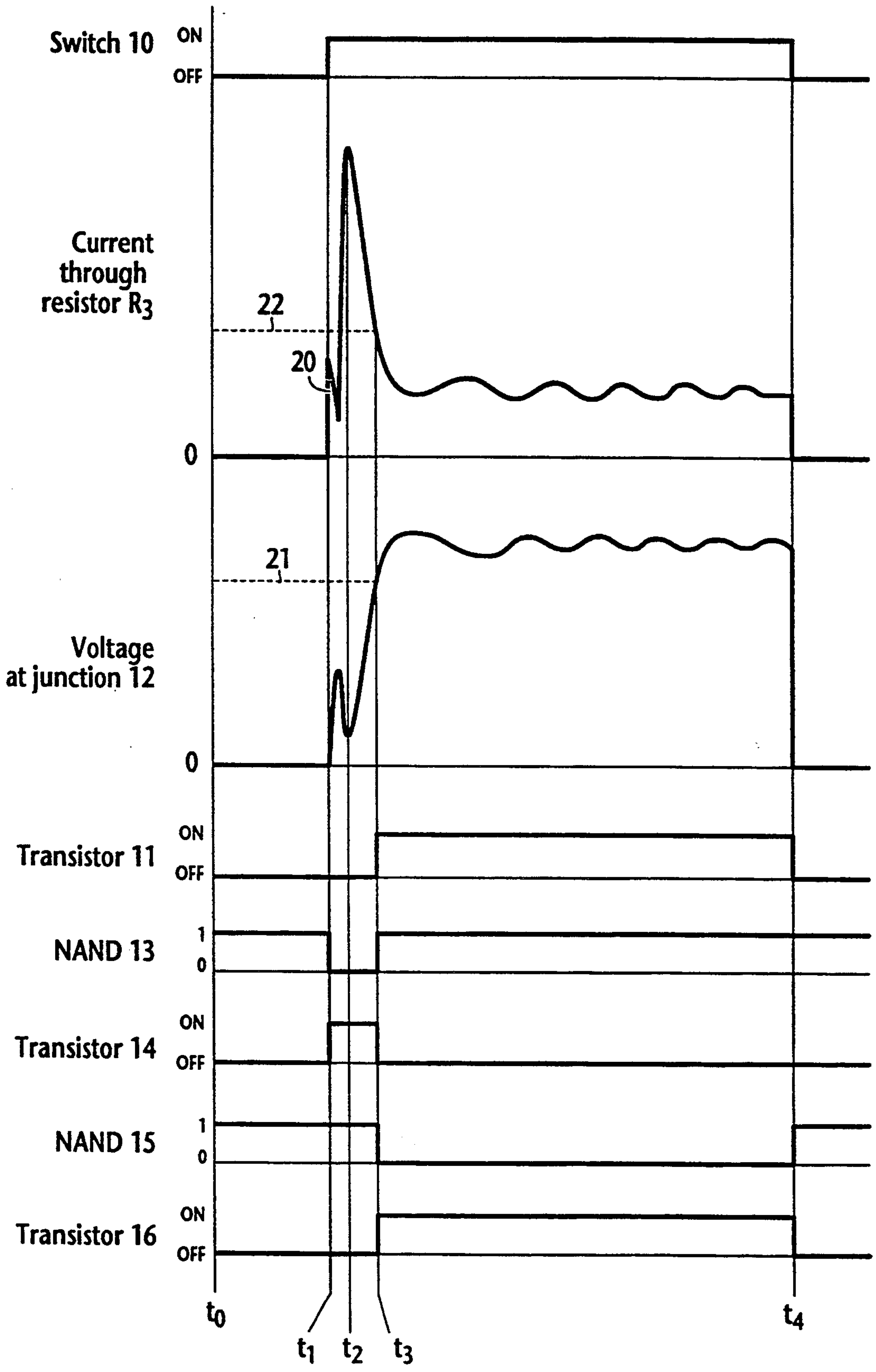
FIG. 2 is a timing diagram associated with the embodiment of FIG. 1.

The operation of the battery switching circuit 7 will be described below with reference to a timing diagram shown in FIG. 2.

When the switch 10 is in a turn-off state during the interval between times $t_0$ and $t_1$, the potential at junction 12 is lower than the threshold voltage of transistor 11 and hence transistor 11 is in a turn-off state, providing a high voltage (logic 1) to one input of NAND gate 13, while the other input of NAND gate 13 is held at a logic-0 level by switch 10. Thus, NAND gate 13 produces a logic-1 output during the interval between $t_0$ and $t_1$. NAND gate 15 is likewise supplied with a logic-0 input from switch 10 to produce a logic-1 output. Therefore, transistors 14 and 16 are also in a turn-off state during the period between $t_0$ and $t_1$.

At time $t_1$ the switch 10 is turned on in response to a signal from the control circuit 3. The positive electrode of the main battery is applied through a protection resistor $R_5$ to NAND gates 13 and 15 as a logic-1 input, and NAND gate 13 is switched to a logic-0 output state which, in turn, drives the transistor 14 into a turn-on state, thus coupling the auxiliary battery to the vibrator. On the other hand, NAND gate 15 is supplied with a logic-0 input from NAND gate 13, and so it remains in the logic-1 output state, causing transistor 16 to remain in the turn-off state.

Since the vibrator is made up of a motor which is equivalently a series circuit of resistive and inductive components, it exhibits a transient phenomenon when the voltage from the auxiliary battery is impressed upon it. If the capacitor 5 is not provided, a voltage approximately equal to the source voltage of the auxiliary battery would otherwise develop across the terminals of the vibrator at the instant the transistor 14 is turned on at time $t_1$, causing transistor 11 to turn on.

Since capacitor 5 is in shunt with the vibrator, a current as indicated by numeral 20 is drawn into capacitor 5 during the interval between $t_1$ and $t_2$ and junction 12 exhibits a low voltage swing far below the threshold voltage of transistor 11 which is indicated by a broken line 21. As a result, a transient surge current begins to flow through resistor $R_3$ into the vibrator during the interval between $t_1$ and $t_2$ and reaches a peak value at time $t_2$. The current through resistor $R_3$ then falls at a rate lower than the rate of its rise as shown in FIG. 2 and the potential at junction 12 increases correspondingly. When the current through resistor $R_3$ falls below a level indicated by a broken line 22 corresponding to the threshold voltage of transistor 11, the potential at junction 12 rises above the threshold level 21 at time $t_3$, causing transistor 11 to turn on.

Therefore, the vibrator motor is set in motion in response to the surge current and gains speed with time and its equivalent impedance increases until the potential at junction 12 attains a steady level.

Since the turn-on of transistor 11 at time $t_3$ presents a logic-0 output to NAND gate 13, the latter is switched to a logic-1 output state which causes transistor 14 to turn off and NAND gate 15 to change to a logic-0 output state, causing transistor 16 to turn on.

It is seen that the current source of the vibrator is switched from the auxiliary battery to the main battery at time $t_3$. During the subsequent interval between time $t_3$ and time $t_4$ at which switch 10 is turned off, the vibrator is energized with a current from the main battery and runs substantially at a constant speed and exhibits a steady value of impedance.

When switch 10 is turned off at time $t_4$, NAND gate 15 produces a logic-1 output and transistor 16 is switched to a turn-off state, cutting the voltage source from the vibrator.

Figure 3:
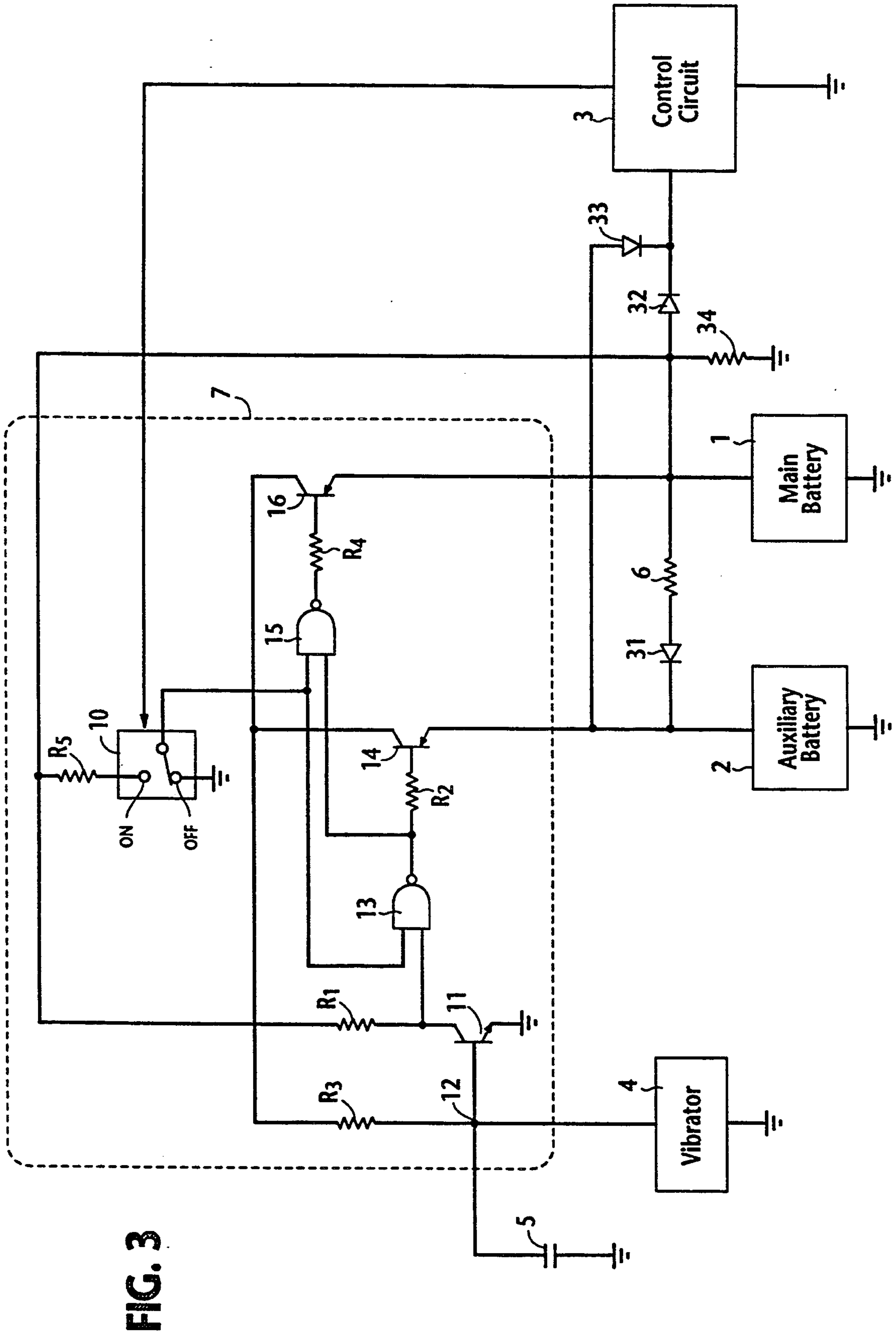
FIG. 3 is a block diagram a power circuit according to a second embodiment of the present invention.

To prevent the loss of data from the memory of the radio display pager, it is desirable to use the auxiliary battery as a backup for the main battery when it is replaced with a fresh battery. For this purpose, a second embodiment of this invention, shown in FIG. 3, includes a first diode 31 disposed between resister 6 and auxiliary battery 2 to allow current to flow through that resistor in a direction from the main battery to the auxiliary battery. A second diode 32 is disposed in a circuit between the main battery and the control circuit to allow current to be supplied to it from the main battery. To establish a backup current during the replacement of the main battery, a third diode 33 is connected in a circuit between the auxiliary battery and the control circuit. The connection from the main battery to switch 10 is grounded by a resistor 34 to instantly drive it to a ground potential in order to deactivate the vibrator if the main battery is displaced from the pager immediately after the vibrator is activated.

What is claimed is:

1. A hand-held electronic apparatus including an inductive device, and a control circuit powered by a first, replaceable battery for producing a control signal for operating the inductive device, the apparatus comprising:

- a second, rechargeable battery having an internal resistance lower than an internal resistance of the first battery;
- a capacitor connected in parallel with the inductive device;
- sensor means for detecting when a voltage developed across the capacitor exceeds a prescribed level and producing a sensor output;
- first switch means responsive to a presence of the control signal for coupling the inductive device to the second battery and responsive to the sensor output for decoupling the inductive device from the second battery; and
- second switch means responsive to the sensor output for coupling the inductive device to the first battery and responsive to an absence of the control signal for decoupling the inductive device from the first battery.

2. A hand-held electronic apparatus as claimed in claim 1, further comprising:

- a first circuit including a first diode and a resistor connected in series between the first and second batteries for drawing a current from the first battery to the second battery;
- a second circuit including a second diode connected between the second battery and the control circuit for drawing a current from the second battery to the control circuit; and
- a third circuit including a third diode connected between the first battery and the control circuit for drawing a current from the first battery to the control circuit.

3. A hand-held electronic apparatus as claimed in claim 2, further comprising a resistor for coupling a junction between the first battery and the second diode to ground.

4. A radio display pager including an inductive device and a control circuit for generating an alert signal for operating the inductive device when a message is received, the control circuit being powered by a first, replaceable battery, the pager comprising:

a second, rechargeable battery having an internal resistance lower than an internal resistance of the first battery;

a capacitor connected in parallel with the inductive device;

sensor means for detecting when a voltage developed across the capacitor exceeds a prescribed level and producing a sensor output;

first switch means responsive to the alert signal for coupling the inductive device to the second battery and responsive to the sensor output for decoupling the inductive device from the second battery; and second switch means responsive to the sensor output for coupling the inductive device to the first battery and responsive to an absence of the alert signal for decoupling the inductive device from the first battery.

5. A radio display pager as claimed in claim 4, further comprising:

a first circuit including a first diode and a resistor connected in series between the first and second batteries for drawing a current from the first battery to the second battery;

a second circuit including a second diode connected between the second battery and the control circuit for drawing a current from the second battery to the control circuit; and a third circuit including a third diode connected between the first battery and the control circuit for drawing a current from the first battery to the control circuit.

6. A radio display pager as claimed in claim 5, further comprising a resistor for coupling a junction between the first battery and the second diode to ground.

7. A hand-held electronic apparatus, comprising:

an inductive device;

a first battery;

a control circuit powered by said first battery, said control circuit providing a control signal for operating said inductive device;

a second battery having an internal resistance lower than an internal resistance of said first battery;

a first coupling circuit responsive to said control signal to couple said inductive device to said second battery, said second battery producing a transient surge current;

a detector coupled to said inductive device, said detector indicating when said surge current attains a predetermined value; and a second coupling circuit connected to said detector to couple said inductive device to said first battery and to decouple said inductive device from said second battery when said surge current attains a predetermined value.

8. A radio display pager for receiving a message, comprising:

an inductive device;

a first battery;

a control circuit powered by said first battery, said control circuit generating an alert signal for operating said inductive device when said message is received;

a second battery having an internal resistance lower than an internal resistance of said first battery;

a first coupling circuit responsive to said alert signal to couple said inductive device to said second battery, said second battery producing a transient surge current;

a detector coupled to said inductive device, said detector indicating when said surge current attains a predetermined value; and a second coupling circuit connected to said detector to couple said inductive device to said first battery and to decouple said inductive device from said second battery when said surge current attains a predetermined value.

* * * * *